(12) United States Patent
Reichel et al.

(10) Patent No.: US 7,515,800 B2
(45) Date of Patent: Apr. 7, 2009

(54) DISPLAY DEVICE WITH FIBER-OPTIC ARRANGEMENT

(75) Inventors: Steffen Reichel, Mehlingen (DE);
Burkhard Danielzik, Bingen (DE);
Kevin Tabor, Webster, MA (US);
Michael Weisser, Southbridge, MA (US)

(73) Assignee: Schott AG (DE)

( * ) Notice: Subject to any disclaimer, the term of this patent is extended or adjusted under 35 U.S.C. 154(b) by 0 days.

(21) Appl. No.: 11/855,056

(22) Filed: Sep. 13, 2007

(65) Prior Publication Data

US 2008/0069505 A1    Mar. 20, 2008

(30) Foreign Application Priority Data

Sep. 14, 2006    (DE) .................. 10 2006 043 947

(51) Int. Cl.
*G02B 6/04* (2006.01)
*G02B 6/06* (2006.01)
(52) U.S. Cl. .................. 385/120; 385/115; 385/901
(58) Field of Classification Search .......... 385/115–121
See application file for complete search history.

(56) References Cited

U.S. PATENT DOCUMENTS

| 4,183,630 | A | * | 1/1980 | Funada et al. ............... 349/159 |
| 5,640,479 | A | * | 6/1997 | Hegg et al. .................. 385/120 |
| 6,046,730 | A | * | 4/2000 | Bowen et al. ............... 345/168 |
| 2002/0007111 | A1 | * | 1/2002 | Deckert et al. .............. 600/177 |

FOREIGN PATENT DOCUMENTS

DE    10 2005 011 956 A1    9/2006

* cited by examiner

*Primary Examiner*—Charlie Peng
(74) *Attorney, Agent, or Firm*—DeMont & Breyer, LLC

(57) ABSTRACT

The invention relates to a display device having a fiber-optic plate and a display with an image plane on which the image information of the display is generated, the fiber-optic plate comprising a fiber bundle with a multiplicity of fiber cores extending beside one another, which are enclosed by a cladding material and which transmit light from an entry face of the fiber-optic plate, facing the display, to an exit face of the fiber-optic plate, wherein the entry face of the fiber-optic plate lies further away from the image plane than the lateral dimension of the smallest image information representable by the display.

30 Claims, 3 Drawing Sheets

DISPLAY DEVICE WITH FIBER-OPTIC ARRANGEMENT

DESCRIPTION

Figure 1:
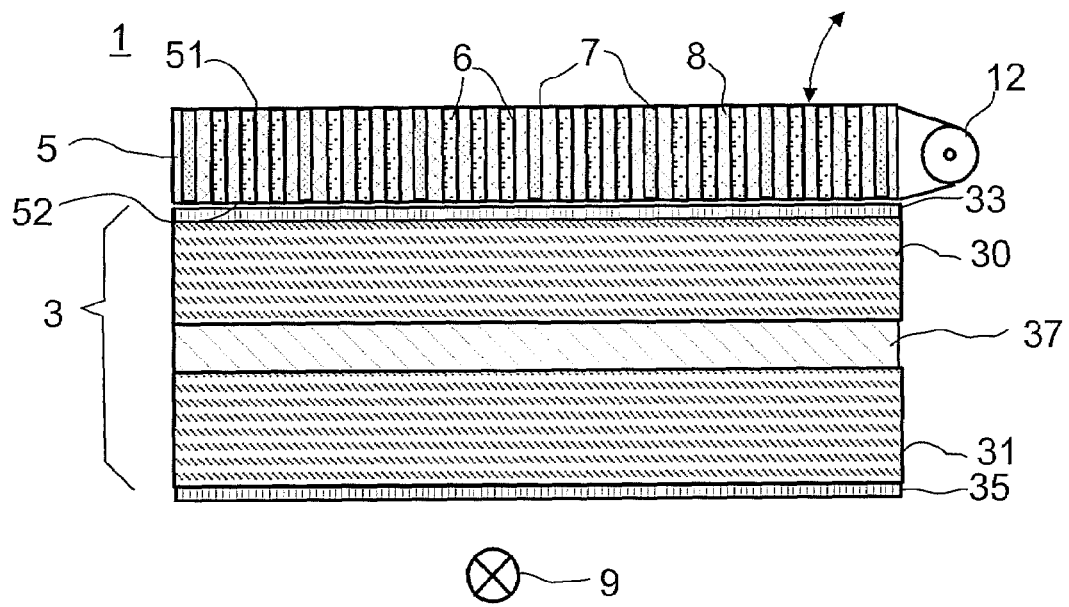

The invention relates to a fiber-optic arrangement for display devices, in particular for analog and digital displays.

It is known to guide light in light-guiding devices for signaling or display purposes.

U.S. Pat. No. 6,690,623 B1 describes time display devices which comprise fiber-optic light guides in order to display the current time on a display face, in particular a dial plate, by means of light emerging from the fibers.

Fiber-optic devices, for example fiber-optic plates, have already been used in order to increase the viewing angle of liquid crystal displays and to improve their homogeneity, as described for example in EP 0 674 209 A1. The distance between the entry face and the fiber-optic plate and the pixel-forming plane should in this case be small compared with the size of a pixel of the display. The fiber-optic plate is in this case separated from the liquid crystal cells only by the ITO electrode layer and the aligning layer for the liquid crystals, these two layers each having a thickness of only a few hundred angstroms.

Inter alia, this entails the problem of intervening in the otherwise conventional design of an LCD display and replacing one of the glass panes, with which the LCD display is constructed, by a fiber-optic plate.

It is therefore an object of the invention to improve displays with fiber-optic plates.

To this end a display device is provided having a fiber-optic plate and a display with an image plane on which the image information of the display is generated, the fiber-optic plate comprising a fiber bundle with a multiplicity of fiber cores extending beside one another, which are enclosed by a cladding material and which transmit light from an entry face of the fiber-optic plate, facing the display, to an exit face of the fiber-optic plate, wherein the entry face of the fiber-optic plate lies further away from the image plane than the lateral dimension of the smallest image information representable by the display.

In particular, a display device is proposed having a fiber-optic plate and a display with an image plane on which the image information of the display is generated, the fiber-optic plate comprising a fiber bundle with a multiplicity of fiber cores extending beside one another, which are enclosed by a cladding material and which transmit light from an entry face of the fiber-optic plate, facing the display, to an exit face of the fiber-optic plate. The entry face of the fiber-optic plate lies at least 300 micrometers away from the image plane.

This is because it has been found that sharper images are obtained on the exit face of the fiber-optic plate even with distances between the fiber-optic plate and the image plane of the display which are longer than, for example, the pixel dimensions of the pixel display or the center spacings of the pixels, i.e. for instance 300 μm or even more in conventional displays. This effect is very surprising since, when there is a distance between the position at which the image information is formed and the entry faces of the fiber cores, information from a given position on the image surface can enter a plurality of fibers. It would therefore be expected a priori that an unsharp image is created for the observer.

The surfaces at which the light emitted by the image plane enters and exits, respectively, are referred to as the entry face and the exit face of the fiber-optic plate. The light exit side may however also be used as a light entry face for light which strikes the fiber-optic plate from the surroundings, in order to illuminate the image plane. This is the case for example in passively illuminated display devices. The fiber cores guide the light by total reflection. To this end, the fiber cores are enclosed by a cladding material with lower refractive index.

In particular the use of a pixel display is envisaged, preferably a matrix pixel display. In such a display, the smallest image information representable by the display is given by the lateral dimension of a pixel. In a color display, these are furthermore in particular the individual color pixels. Precisely in this case, it has been found that sharp images can be obtained even if the center spacing of nearest neighbor pixels is less than the distance from the image plane of the pixel display to the entry face of the fiber-optic plate. In particular the longest side dimension of the pixels may be at most 250, particularly preferably at most 160 micrometers. The pixels are often designed rectangularly, for example, in which case the long side of the rectangle of a pixel is at most 160 micrometers long. The pixel size may even be much less in micro-displays, in particular less than 10 micrometers.

The fibers may have an average spacing in the range of from 2 to 100, preferably from 6 to 60 micrometers. The entry face of the fiber-optic plate may even lie further away from the image plane of the display, sufficiently sharp images still remaining visible on the exit face of the fiber-optic plate. In an advantageous refinement of the invention, the entry face of the fiber-optic plate may also be arranged at least 600 micrometers away from the image plane.

The effect that surprisingly sharp images remain visible, even though the fiber-optic plate lies too far away from the display for this per se, is at least assisted by a display with a light emission lobe directed further forward compared with a Lambert radiator, i.e. a radiator emitting as a diffuse surface.

Liquid crystal or LCD displays are particularly suitable in this case. With such displays in which the image plane corresponds to the liquid crystal layer, the emission is predominantly perpendicular to the surface owing to the polarization effect. This still applies even for modern LCD displays with a high viewing angle, such as LCD displays with VA technology (VA=vertical alignment), for example VA-LCDs, MVA-LCDs, PVA-LCDs. There may however also be such an emission characteristic in the case of other displays, or it may produced by additional measures.

Furthermore, the invention is particularly suitable for small displays, for instance with an image diagonal of at most 40 cm, preferably 10 cm or even at most 5 cm. Micro-displays with even smaller image diagonal is, for example with dimensions of as little as 0.5×0.5 cm, are still very highly suitable. Fiber-optic plates can be produced relatively inexpensively for such small displays.

Even though it might be assumed per se that the resolution of the image information on the exit face of the fiber-optic plate is less than the resolution of the image information in the image plane, it has furthermore surprisingly been found that oversampling by means of the fiber-optic plate can nevertheless at least limit any resolution loss effectively. According to a refinement of the invention, therefore, the fibers have an average lateral spacing of their mid-axes (also referred to as pitch) which is less by at least a factor of 2, preferably a factor of three than the center spacing of the pixels of the display. In the case of very small displays such as so-called micro-displays, however, it may even be sufficient for the lateral spacing of the mid-axes of the fiber cores to be similar to the center spacing of the pixels of the pixel display. Preferably, however, the center spacing of the pixels of the pixel display is less than the center spacing of the fiber cores by at most a factor of 1.5, in order to limit any resolution loss.

In relation to the surface area of the pixels, oversampling may be provided such that the fibers in the fiber-optic plate have a lateral density of at least 6 fibers per pixel, preferably at least 9 fibers per pixel.

In general, the fiber core diameter of the fibers should be at most 100 micrometers. Even larger fiber core diameters may however even be provided depending on the application, for instance when the light exit face generally lies far away from the observer. For many applications, fiber core diameters of the fibers in the range of from 2 to 100 micrometers are suitable. There are then essentially also corresponding values for the center spacings of the preferably thin fiber claddings. Accordingly, the fibers preferably have an average lateral spacing of their mid-axes in the range of from 2 to 100 micrometers.

With the invention a transparent plate may be provided on or over the image plane of the display, in which case the fiber-optic plate is in turn arranged over the transparent plate. In particular, the transparent plate may be a support plate of the display. For example, an LCD display will be constructed with two plates between which the liquid crystal cells are enclosed, at least the front plate being transparent. Such an LCD display or another pixel display may now readily be used according to the invention, and the fiber-optic plate may be placed onto the front plate of the display.

Previously, fiber-optic plates with high numerical apertures, in particular with numerical apertures of close to one, have frequently been used in order to achieve a high viewing angle. In contrast, however, small numerical apertures are preferred for the invention. These numerical apertures make the fiber-optic plate suitable for directing the image information deliberately into particular directions. Using such a fiber-optic plate, the angle range in which the displayed information is visible can thus deliberately be restricted. This is expedient, for example, when displayed information is intended only for one observer. This, for example, can prevent information presented on a display of the PDA (PDA=Personal Digital Assistant), or a handheld computer or a mobile telephone, from being visible to third parties who view the display device at a larger angle.

Another field of application is to block out superfluous information for third parties. For example display instruments such as nautical instruments in avionics with such a fiber-optic plate may ensure that only the person who requires the displayed information can actually see it, so that other persons are not over overburdened with unnecessary information. By means of the fiber-optic plate, therefore, the information can generally be directed to where it is needed.

A fiber-optic plate in which the fiber cores extend obliquely with respect to the entry or exit face so that the angle range, in which the displayed information is visible, is tilted relative to the normal to the entry or exit face, may also be used particularly advantageously for this. According to a refinement of this embodiment of the invention, the fibers may be tilted by at least 5°, up to at most 45°, with respect to the normal of the entry or exit face. The fiber-optic plate may furthermore be reversibly deployable, and in particular can be folded or slid in front of the display. Image information can thereby selectively be blocked out or included for third parties.

Numerical apertures in the range of from 0.2 to 0.5, particularly in the range of from 0.25 to 0.4, are particularly preferred. For somewhat wider viewing angles, the fibers may also have a numerical aperture in the range of from 0.5 to 0.7. Even numerical apertures greater than 0.7 may still be advantageous for certain applications. In general, low numerical apertures are advantageous in order to preserve the resolution of the display device as much as possible even with the large distance from the image plane to the fiber-optic plate as is provided according to the invention. Owing to the small numerical aperture, light rays which enter the fiber-optic plate at larger angles are no longer guided in the fiber cores. Some of the light rays then pass obliquely through the fiber-optic plate and are scattered when passing laterally through the fiber cores, so that the image contrast is reduced.

Absorbing regions, which absorb light that is not guided by total reflection in the fiber cores, may very advantageously also be provided in the fiber-optic plate. The scattered light is thereby reduced and the contrast is improved.

Black glass is preferably used as an absorbing material for this. The absorbing material may be employed in the form of black fibers extending parallel to the fiber cores in the fiber-optic plate.

Alternatively or in addition, black glass-clad fiber cores may also be used for the fiber-optic plate.

The effect achieved by the absorbing material is that with a virtually constant image brightness for the observer, the contrast is improved and in particular the emitted scattered light is minimized. Interfering illumination effects are therefore avoided by the display device. For display instruments or displays in the fields of avionics or vehicles, undesired illumination of the cockpit can thus in particular be avoided. Excessive proportions of the absorbing material, however, may cause darkening of the display device. The ratio of the volume proportions of the fiber cores to the absorbing material is therefore preferably at least 3/1. If the fiber-optic plate is very thin, however, then even higher proportions of absorbing material may be expedient in order to prevent light obliquely entering the plate from reaching the exit face.

The fiber-optic plate is furthermore preferably designed as a flat component, in which the fibers of the fiber-optic plate are correspondingly shorter than the diameter or the side dimension of the entry face of the fiber-optic plate. Inter alia, the overall height of the display device will be kept small by such a design.

The invention is suitable in particular for a display of a mobile communication or computing device, in particular a PDA or a mobile telephone, for a head-mounted display, for a motor vehicle instrument such as a tachometer, rpm counter, a multifunctional display, for an avionics instrument, in particular an altimeter, airspeed indicator, artificial horizon, GPS navigation system, for a nautical instruments, for instance a compass, log, sounding device or GPS navigation system, as well as for submerged devices, such as underwater vehicles, and in this case particularly for a pressure, voltage, current or filling level display.

Figure 2:
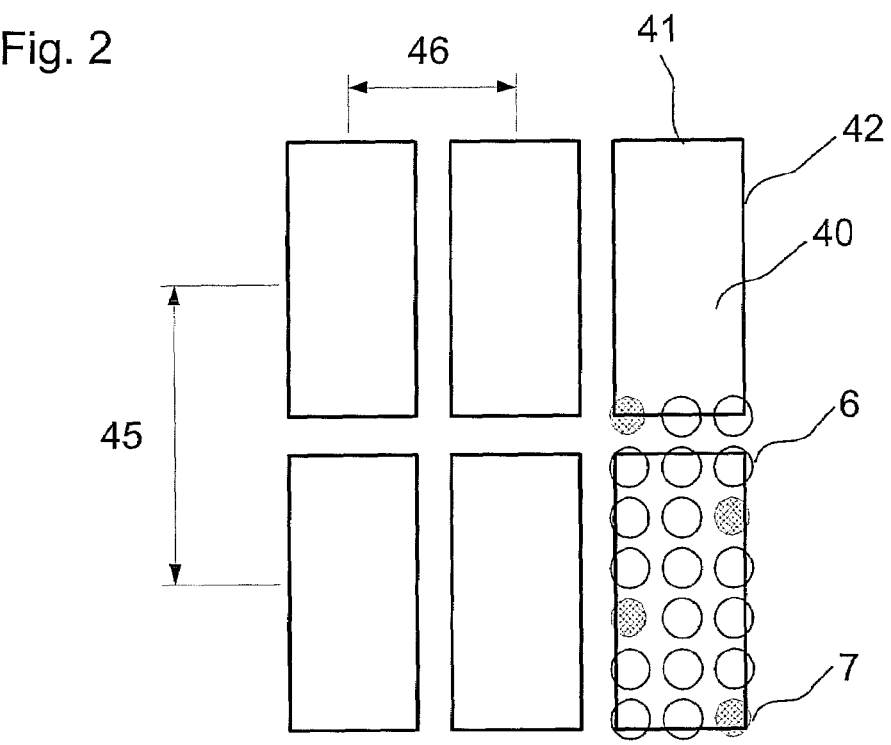
Figure 3A:
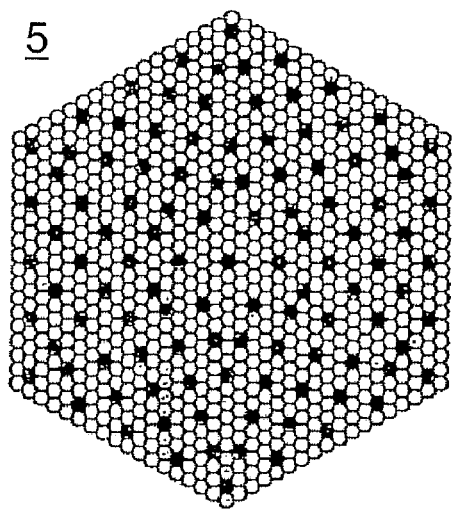
Figure 3B:
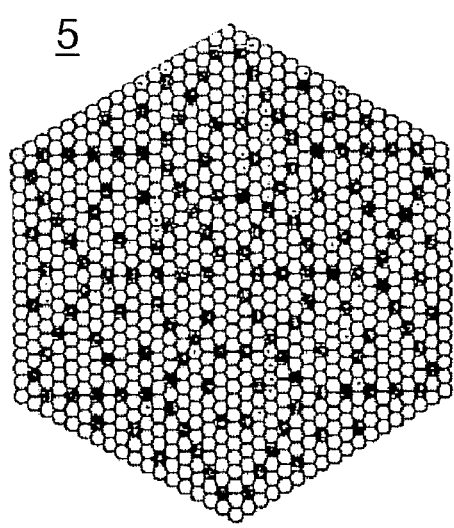
Figure 3C:
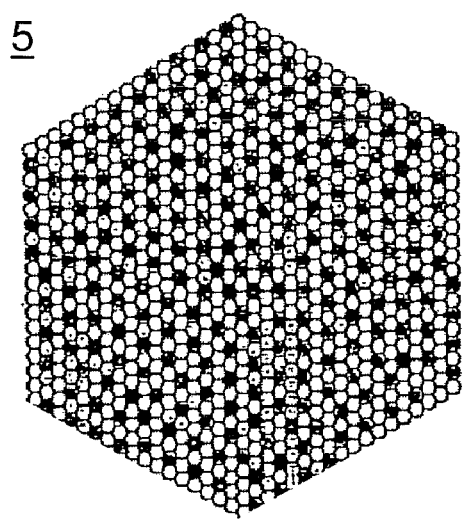
Figure 3D:
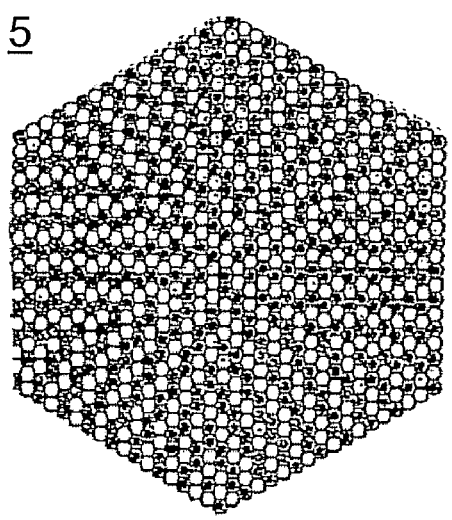
Figure 4:
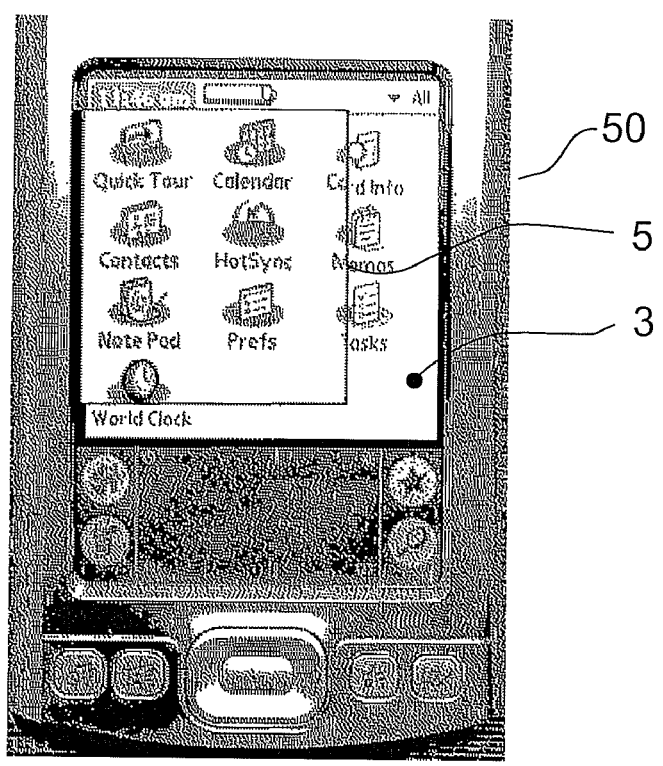
Figure 5:
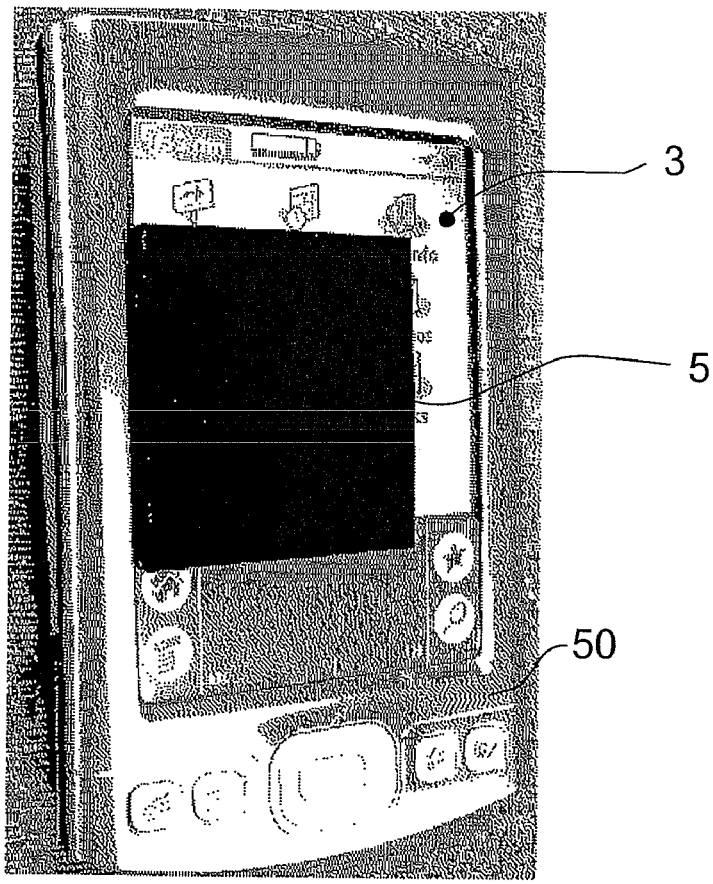

The invention will be explained in more detail below with the aid of exemplary embodiments and with reference to the appended drawings, in which references that are the same denote identical or similar parts:

FIG. 1 shows a schematic cross section through an exemplary embodiment of a display device according to the invention, FIG. 2 shows a plan view of parts of the display device, FIG. 3A to 3D show fiber-optic plates with different distributions of black fibers, FIG. 4 shows a photograph of a PDA with an applied fiber-optic plate, in a direction perpendicularly onto the display, and FIG. 5 shows a photograph of the PDA obliquely onto the display.

The display device 1 represented in FIG. 1 comprises a pixel liquid crystal display 3 with glass support plates 30, 31. Polarization films 33, 35 are arranged externally on the glass support plates 30, 31. The liquid crystal cells 37 are furthermore enclosed as a matrix between the glass support plates 30, 31. The image plane, on which the image information is generated, therefore also lies between the two support plates 30, 31.

The pixel liquid crystal display 3 is backlit by means of an illumination device 9. The light from the illumination device 9 is polarized by the polarization film 35 and then passes through the glass support plate 31. In the cells 37, the polarization direction is subsequently rotated selectively. The light emerging through the glass support plate 30 is then transmitted selectively by the polarization film 33.

A fiber-optic plate 5 is now arranged on this glass support plate 30, or on the polarization film applied thereon. The fiber-optic plate comprises a light entry face 52 facing the display 3 and a light exit face 51 on the observer side. The fiber-optic plate 5 comprises light-guiding fiber cores 6, which are enclosed by a cladding material 8 with lower refractive index so that light is guided along the fiber cores 6 by total reflection so long as the incidence angle of the light is less than the critical angle determined by the numerical aperture. The fiber cores 6 respectively end in the exit face 51 and the entry face 52, so that they can transmit light from the entry face 52 of the fiber-optic plate 5, facing the display 3, to the exit face 51.

The glass support plate 30 has a thickness of at least 300 micrometers, preferably at least 600 micrometers, in order to provide the requisite mechanical stability of the display. Accordingly, the fiber-optic plate 5 is also separated by at least 300 micrometers, preferably even more than 600 micrometers away from the image plane of the display 3, and therefore generally further than the center spacing of the pixels. It is surprisingly found in this case that sufficiently sharp images of the image plane are also transmitted onto the exit face 51 with side dimensions of the pixels smaller than 250 micrometers, or even with side dimensions smaller than 160 micrometers, or a center spacing of nearest neighbor pixels which is less than the distance from the image plane of the pixel display to the entry face of the fiber-optic plate.

This surprising property of an arrangement as shown by way of example in FIG. 1 is reinforced in particular by preferably using small numerical apertures of the light-guiding fiber cores 6. To this end the materials of the fiber cores 6 and the cladding material 8 are selected so that the numerical aperture lies in the range of from 0.2 to 0.5, preferably in the range of from 0.25 to 0.4. Depending on the field of application, somewhat higher numerical apertures in the range of from 0.5 to 0.7 may also be used. The effect of the small numerical aperture, or the concomitant small acceptance angle of the fiber cores 6, is that the fibers only guide light from small regions of the image plane which lie in extension of the optical axis of the fiber cores 6, i.e. respectively perpendicularly to the entry face 52 here.

Another effect of the comparatively small numerical aperture of the fibers is that the image disappears for the observer when they view the fiber-optic plate 5 at an oblique angle which is greater than the acceptance angle, the acceptance angle being given by the arcsine of the numerical aperture. This can advantageously be utilized in order to provide the image information to the observer in a controlled way.

If a third party, for whom the image information of the display 3 is not intended, views the device at such an excessively oblique angle, then the image disappears. It is also advantageous for the efficiency of the display device that the pixels of the display should have a light emission lobe directed further forward compared with a Lambert radiator. This is also generally the case particularly with a liquid crystal display as in the example shown in FIG. 1.

Since the image information is in any case no longer visible when viewed at an angle to the normal of the exit face which lies above the acceptance angle, scattered light which still emerges at these angles may also be blocked out. To this end, in a refinement of the invention, the fiber-optic plate 5 comprises absorbing regions which absorb light that is not guided by total reflection in the fiber cores. Since the display device 1 then emits no light at angles greater than the acceptance angle, or at least emits only a little light, a maximum brightness can be achieved for the observer with minimal illumination of the surroundings by the display 3. This is favorable inter alia in order to minimize the illumination of a cockpit, such as a vehicle or aircraft cockpit.

In the example of a display device 1 as shown in FIG. 1, black glass is provided as the absorbing material. To this end black fibers 7, extending parallel to the fiber cores 6 in the fiber-optic plate 5, are provided in the fiber-optic plate 5. Alternatively or in addition, the fiber-optic plate 5 may also be produced with black glass-clad fibers, so that there are black glass-clad fibers 6 in the fiber-optic plate 5.

It has been found that ratio of the volume proportions of the fiber cores to the absorbing material of at least 3/1 is already sufficient so that light passing obliquely through the fiber-optic plate 5, but not guided in the fiber cores 6, is absorbed virtually completely. Owing to the small proportion of absorbing material, preferably in the form of a black fibers as in the example shown, it is possible to provide a sufficiently high density of fiber cores and therefore avoid a significant reduction of the brightness.

Depending on the case, restricting the visibility for third parties or in general at angles greater than the acceptance angle may be desirable or problematic. Both cases may for example arise when viewing contents with the display device when it is part of a mobile device, such as a mobile telephone or a PDA. Thus, it may be desirable that for instance third parties do not see the contents of the display. On the other hand, for instance, the possibility should be provided to view a video sequence together with friends. In order to restrict the visibility of the information selectively, the fiber-optic plate 5 may therefore be fastened so that it is reversibly deployable as in the example shown in FIG. 1. In the example shown in FIG. 1, the fiber-optic plate 5 is fastened on the display device 1 so that it can be folded in front of the display by means of a hinge 12.

FIG. 2 shows a plan view of a part of a matrix crystal display of a display device 1 according to the invention. A few pixels 40 are represented, which may for example also be liquid crystal cells 37 as in the exemplary embodiment shown in FIG. 1. In the example shown in FIG. 2, the pixels 40 are designed rectangularly and respectively comprise a short side 41 and a long side 42. The side dimension of the pixels, i.e. the length of the side 42, is at most 250, preferably at most 160 micrometers. The center spacing 45 of nearest neighbor pixels is also less along the long sides 42 than the distance from the image plane of the pixel display to the entry face of the fiber-optic plate. This then likewise applies for the center spacing 46 in the direction along the short sides 41 as well.

Also represented are a few fiber cores of the fiber-optic plate arranged above the matrix pixel display as seen in the viewing direction. As in the example shown in FIG. 1, the fiber-optic plate comprises both light-guiding fiber cores 6 and black fibers 7. The average lateral spacing of the mid-axes of the fiber cores 6, 7 is significantly less than the side dimensions of the pixels and therefore also than their center spacing. Associated with this fact, the fibers in the fiber-optic plate also have a lateral density of at least 6 fibers per pixel, preferably at least 9 fibers per pixel. In the example shown in FIG. 2 about 15 fibers, including the black fibers 7 and about 12 light-guiding fiber cores 6, may respectively be assigned to a pixel.

The oversampling by assigning a plurality of fibers to each pixel 40 proves advantageous for the image plane's image as reproduced on the exit face of the fiber-optic plate, even though there is a distance between the entry face of the fiber-optic plate and the image plane which is greater than the pixel spacing. In order to achieve the oversampling, the fiber core diameter of the fibers is less than the lateral dimensions of the pixels and, for the example shown in FIG. 2, lies in the range of from 2 to 80 micrometers.

FIGS. 3A to 3D represent various fiber-optic plates 5 in plan view with exemplary distributions of black fibers. The black fibers are respectively represented as black-filled circles and the light-guiding fiber cores as white-filled circles. The density of the black fibers increases successively from the example of FIG. 3A to the example of FIG. 3D. In the example shown in FIG. 3D, the density of the black fibers is comparable with the density of the light-guiding fiber cores. In this example, the ratio of the volume proportions of the fiber cores to the absorbing material is therefore also significantly less than 3/1. Such a configuration may likewise be expedient, for example in order to ensure full screening of obliquely emerging light even in the case of a very thin fiber-optic plate.

FIGS. 4 and 5 show the effect of the fiber-optic plate on a display of the PDA 50. In FIG. 4, the with an applied fiber-optic plate 5 was photographed in a direction perpendicularly onto the display 3. As can be seen with the aid of the photograph, the display 3 is darkened only insignificantly by the fiber-optic plate 5 under perpendicular viewing.

Conversely, the fiber-optic plate 5 appears almost fully dark with the viewing as shown in FIG. 5 obliquely at an angle to the normal of the display which is greater than the acceptance angle of the fiber cores. The display's image information displayed under the plate can no longer be seen. In this case a third party, who views the PDA 50 at this angle, may even come to the conclusion that the device is switched off.

It is clear to the person skilled in the art that the invention is not restricted to the exemplary embodiments described above, but may be modified in a variety of ways. In particular, the features of the individual exemplary embodiments described with the aid of the figures may also be combined with one another.

The invention claimed is:

1. A display device having a fiber-optic plate and a display with an image plane on which the image information of the display is generated, and having a display with a light emission lobe directed further forward compared with a Lambert radiator, the fiber-optic plate comprising a fiber bundle with a multiplicity of fiber cores extending beside one another, which are enclosed by a cladding material and which transmit light from an entry face of the fiber-optic plate, facing the display, to an exit face of the fiber-optic plate, wherein the entry face of the fiber-optic plate lies at least 300 micrometers away from the image plane.

2. The display device as claimed in claim 1, wherein the fibers have an average spacing in the range of from 2 to 70 micrometers.

3. The display device as claimed in claim 1, wherein the entry face of the fiber-optic plate lies at least 600 micrometers away from the image plane.

4. The display device as claimed in claim 1, wherein the display comprises a pixel display.

5. The display device as claimed in claim 4, wherein the center spacing of nearest neighbor pixels is less than the distance from the image plane of the pixel display to the entry face of the fiber-optic plate.

6. The display device as claimed in claim 4, wherein the longest side dimension of the pixels is at most 250 micrometers.

7. The display device as claimed in claim 5, having a liquid crystal display.

8. The display device as claimed in claim 1, wherein the display has an image diagonal of at most 10 cm.

9. The display device as claimed in claim 4, wherein in that the fibers have an average lateral spacing of their mid-axes which is less by at least a factor of 2 than the center spacing of the pixels of the display.

10. The display device as claimed in claim 4, wherein the center spacing of the pixels of the pixel display is less than the center spacing of the fiber cores by at most a factor of 1.5.

11. The display device as claimed in claim 4, wherein the fibers have an average lateral spacing of their mid-axes in the range of from 2 to 100 micrometers.

12. The display device as claimed in claim 4, wherein the fibers in the fiber-optic plate have a lateral density of at most 6 fibers per pixel.

13. The display device as claimed in claim 1, wherein the fiber core diameter of the fibers is at most 100 micrometers.

14. The display device as claimed in claim 1, wherein the fiber core diameter of the fibers lies in the range of from 2 to 80 micrometers.

15. The display device as claimed in claim 1, wherein a transparent plate is arranged on the image plane of the display and the fiber-optic plate is arranged over the transparent plate.

16. The display device as claimed in claim 1, wherein the transparent plate is a support plate of the display.

17. The display device as claimed in claim 1, wherein the fibers have a numerical aperture in the range of from 0.2 to 0.5.

18. The display device as claimed in claim 1, wherein the fibers have a numerical aperture in the range of from 0.5 to 0.7.

19. The display device as claimed in claim 1, wherein the fibers have a numerical aperture of more than 0.7.

20. The display device as claimed in claim 1, wherein the fiber-optic plate comprises absorbing regions which absorb light that is not guided by total reflection in the fiber cores.

21. The display device as claimed in claim 20, having black glass as the absorbing material.

22. The display device as claimed in claim 20, having black fibers extending parallel to the fiber cores in the fiber-optic plate.

23. The display device as claimed in claim 20, having fiber cores clad by black glass.

24. The display device as claimed in claim 20, wherein the ratio of the volume proportions of the fiber cores to the absorbing material is at least 3/1.

25. The display device as claimed in claim 1, wherein the fibers of the fiber-optic plate are shorter than the diameter or the side dimension of the entry face of the fiber-optic plate.

26. The display device as claimed in claim 1, wherein the fiber cores of the fiber-optic plate extend obliquely with respect to the entry or exit face so that the angle range, in which the displayed information is visible, is tilted relative to the normal to the entry or exit face.

27. The display device as claimed in claim 1, wherein the fibers are tilted by at least 5°, up to at most 45° relative to the normal of the entry or exit face.

28. A display of a mobile communication or computing device, designed as claimed in claim 1.

29. A head-mounted display, designed as claimed in claim 1.

30. A display device having a fiber-optic plate and a display with an image plane on which the image information of the display is generated, the fiber-optic plate comprising a fiber bundle with a multiplicity of fiber cores extending beside one another, which are enclosed by a cladding material and which transmit light from an entry face of the fiber-optic plate, facing the display, to an exit face of the fiber-optic plate, wherein the entry face of the fiber-optic Plate lies at least 300 micrometers away from the image plane, and wherein the fiber-optic plate is fastened so that it is reversibly deployable.

\* \* \* \* \*